United States Patent
Kaus

(10) Patent No.: US 11,716,447 B2
(45) Date of Patent: Aug. 1, 2023

(54) SYSTEM AND METHOD FOR REAL-TIME AUDIOVISUAL INTERACTION WITH A TARGET LOCATION

(71) Applicant: WALDSTOCK LTD, Tallinn (EE)

(72) Inventor: Sander Kaus, Tallinn (EE)

(73) Assignee: Waldstock, Ltd., Tallinn (EE)

( * ) Notice: Subject to any disclaimer, the term of this patent is extended or adjusted under 35 U.S.C. 154(b) by 0 days.

(21) Appl. No.: 17/344,793

(22) Filed: Jun. 10, 2021

(65) Prior Publication Data

US 2021/0314527 A1 Oct. 7, 2021

Related U.S. Application Data

(63) Continuation of application No. 16/559,386, filed on Sep. 3, 2019, now Pat. No. 11,039,107, which is a continuation of application No. 13/627,924, filed on Sep. 26, 2012, now Pat. No. 10,404,946.

(51) Int. Cl.
*H04N 7/18* (2006.01)
*G06Q 10/02* (2012.01)

(52) U.S. Cl.
CPC .............. *H04N 7/18* (2013.01); *G06Q 10/02* (2013.01)

(58) Field of Classification Search
CPC ...... H04N 7/18; G06Q 10/02; G06Q 30/0261; G06Q 30/0207; G06Q 30/0251; G06Q 30/0252; G06Q 30/0255; G06Q 30/0269; G06Q 50/01

See application file for complete search history.

(56) References Cited

U.S. PATENT DOCUMENTS

| | | | |
|---|---|---|---|
| 7,826,966 B2 | 11/2010 | Little et al. | |
| 8,005,057 B2 | 8/2011 | Lim | |
| 8,111,282 B2 | 2/2012 | Cutler et al. | |
| 8,145,516 B2 | 3/2012 | Blanchard, III et al. | |
| 2003/0100315 A1 | 5/2003 | Rankin | |
| 2006/0186197 A1* | 8/2006 | Rosenberg ............. | G06Q 30/00 235/375 |
| 2006/0190309 A1 | 8/2006 | Ewart et al. | |
| 2007/0268392 A1 | 11/2007 | Paalasmaa et al. | |
| 2009/0017916 A1 | 1/2009 | Blanchard, III et al. | |

(Continued)

OTHER PUBLICATIONS

Karizma Lets You Video Chat With People Around You, Whether You Know Them or Not, http://techcrunch.com/2011/05/19; published May 23, 2011; downloaded May 4, 2012; 3 pages.

*Primary Examiner* — Yogeshkumar Patel
(74) *Attorney, Agent, or Firm* — Polsinelli PC

(57) ABSTRACT

Systems and methods of real-time audiovisual interaction with a target location includes receiving an identification of a target location. The identification can be received at a processor of a server from an electronic device of an end-user. A request can be transmitted for a video feed associated with the target location. For example, the video feed can be a live video feed of an interior of the target location or a video chat with a representative of the target location. In response to receiving the video feed, the video feed can be transmitted to the electronic device of the end-user. When audiovisual communication is established, a user can view different aspects of a target location, for example the capacity of a restaurant or speak directly with a representative of a clothing store to see if they have a specific item in the users' size.

20 Claims, 11 Drawing Sheets

(56) References Cited

U.S. PATENT DOCUMENTS

| | | |
|---|---|---|
| 2009/0096573 A1 | 4/2009 | Graessley |
| 2009/0265105 A1 | 10/2009 | Davis et al. |
| 2009/0322671 A1 | 12/2009 | Scott et al. |
| 2010/0009698 A1 | 1/2010 | Yang et al. |
| 2010/0082447 A1 | 4/2010 | Lin et al. |
| 2011/0187864 A1 | 8/2011 | Snider |
| 2011/0199479 A1 | 8/2011 | Waldman |
| 2011/0214082 A1 | 9/2011 | Osterhout et al. |
| 2012/0052880 A1 | 3/2012 | Hymel et al. |
| 2012/0059729 A1* | 3/2012 | Roa ............... G06Q 30/0601 705/26.1 |
| 2012/0078726 A1* | 3/2012 | Black ............. G06Q 30/0251 709/204 |
| 2012/0123871 A1* | 5/2012 | Svendsen .......... G06Q 50/01 705/14.67 |
| 2013/0027227 A1* | 1/2013 | Nordstrom ........ G01C 21/3438 340/990 |
| 2013/0050394 A1 | 2/2013 | Zhou |
| 2013/0095855 A1 | 4/2013 | Bort |
| 2013/0210393 A1* | 8/2013 | Hillier .............. H04W 4/021 455/456.1 |
| 2014/0006129 A1 | 1/2014 | Heath |

* cited by examiner

SYSTEM AND METHOD FOR REAL-TIME AUDIOVISUAL INTERACTION WITH A TARGET LOCATION

CROSS-REFERENCE TO RELATED APPLICATION

This application is a continuation of U.S. patent application Ser. No. 16/559,386, filed Sep. 3, 2019, which claims priority to U.S. patent application Ser. No. 13/627,924, filed Sep. 26, 2012, which are hereby incorporated by reference for all purposes as if fully set forth herein.

FIELD OF TECHNOLOGY

The present disclosure relates generally to electronic maps, and more specifically, to a system and method of real-time interaction with a target location.

BACKGROUND

Electronic devices, tablet computers and smart phones, enabled for media playback allow the user of the electronic device to watch videos, listen to music, watch and listen to streamed media, listen to a radio station, watch movies, watch animations, play video games, or otherwise listen, view, or interact with media content. Additionally, electronic devices can also be enabled to access geographical location information relating to the current location of the electronic device. Conventional systems and methods of determining the location of an electronic device typically determine an approximate location of the electronic device. For example, GPS systems identify location of an electronic device by GPS coordinates that are indicative of an approximate longitude and latitude of the electronic device. Triangulation of the location of an electronic device with respect to cellular towers also identifies an approximate location of the electronic device. In another conventional system, which determines an electronic device's location using Wireless Fidelity (Wi-Fi) access points, when an electronic device is determined as being visible to the device or accessible by the device, the location associated with the MAC address (typically longitude and latitude coordinates) of the Wi-Fi hotspot is approximated as the location of the electronic device.

These electronic devices have provided users with multimedia experiences which have grown more integral in our everyday lives. While conventional technologies provide both multimedia and location determination, such as Dabble™, Foursquare™, Instagram™ Facebook™, and Twitter™ etc., none of these applications provide the user with live or real-time data with which to analyze a target location and remotely predict their own personal user experience. Traditional technologies rely on crowd-sourcing the task of acquiring information for their users, from their other users.

BRIEF DESCRIPTION OF THE DRAWINGS

In order to describe the manner in which the features of the disclosure can be obtained, a more particular description of the principles briefly described above will be rendered by reference to specific examples thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1:
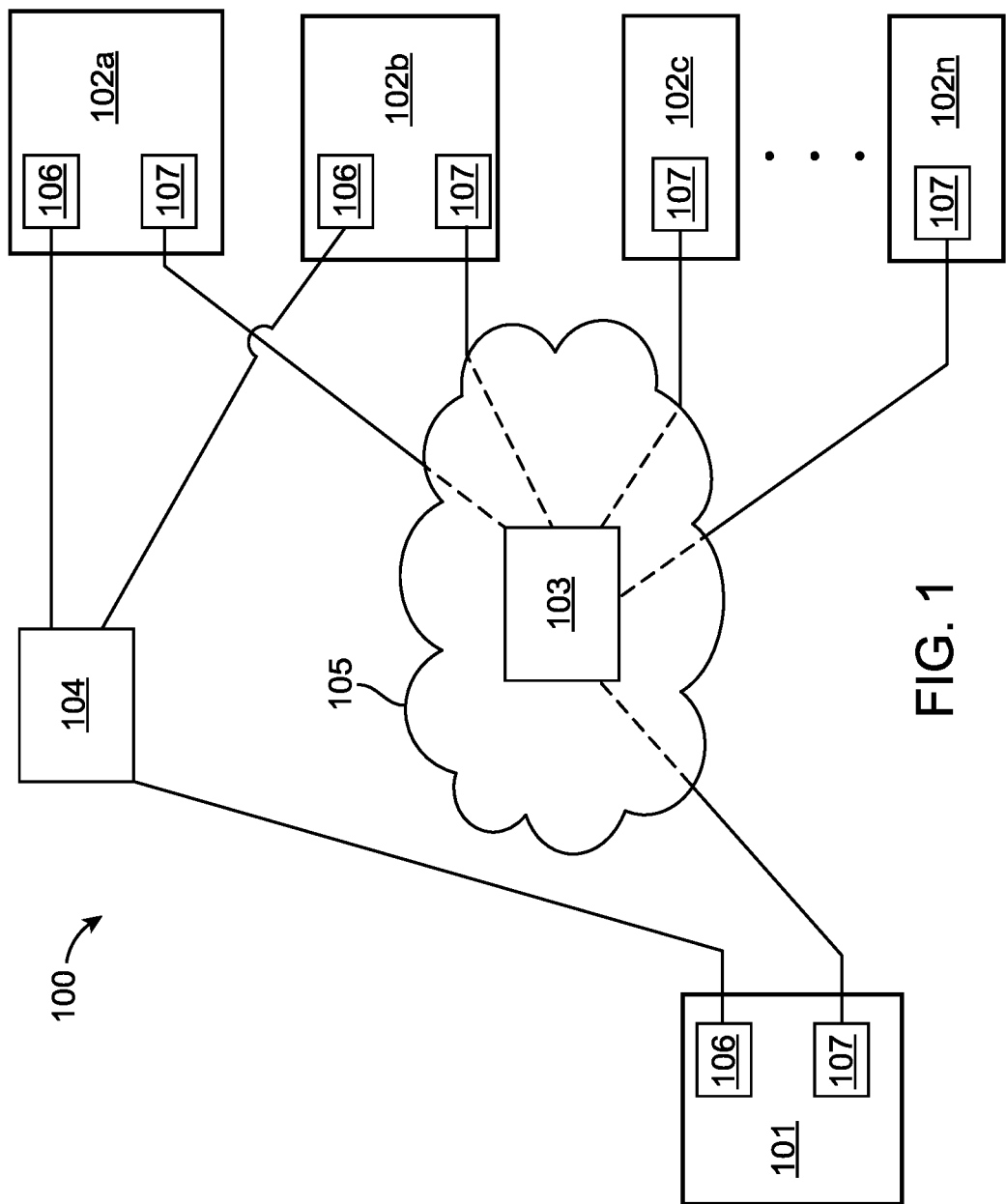
FIG. 1 is a block diagram of a system for real-time interaction with a target location including an electronic device interacting, via a location module and a data network connection to a communication network, with a plurality of target locations that each have an associated electronic device, in accordance with an example implementation of the present technology.

Various examples of the disclosure are discussed in detail below. While specific implementations are discussed, it should be understood that this is done for illustration purposes only. The examples are non-limiting and it will be understood that other components and configurations can be used without parting from the scope of the disclosure.

Several definitions that apply throughout this disclosure will now be presented. The word "coupled" is defined as connected, whether directly or indirectly through intervening components, and is not necessarily limited to physical connections. The term "communicatively coupled" is defined as connected whether directly or indirectly through intervening components, is not necessarily limited to a physical connection, and allows for the transfer of data.

"Electronic devices" can include, but are not limited to, portable communication devices, mobile communication devices, mobile computers, smartphones, computing pads, tablet computers, personal computers, desktop computers, laptop computers, netbooks, servers, routers, set-top phones, or other electronic devices capable of at least accepting data, transmitting data, and executing commands.

"Highlighting" can include, but is not limited to, changing the color of the graphical item, changing the font or appearance of the graphical item, applying a background color to the graphical item, superimposing a block of semi-transparent color over the graphical item, placing a border around the graphical item, enlarging the graphical item as compared to other graphical items proximate to the highlighted graphical item, or other similar and known methods of highlighting graphical items or text items display on a display screen.

"Memory" can include, but in not limited to, transitory memory and non-transitory memory. For example, non-transitory memory can be implemented as Random Access Memory (RAM), Read-Only Memory (ROM), flash, ferromagnetic, phase-change memory, and other non-transitory memory technologies.

"Location aware" can include, but in not limited to, the ability of an electronic device to passively or actively determine its current geographical location. For example, an electronic device can determine its current geographical location locally by using such technologies as Real-Time Locating System (RTLS), Wireless Personal Area Network (WPAN), Wireless or Wired Local Area Network (LAN) or Digital Enhanced Cordless Telecommunications (DECT) for determining the location of the electronic device. An electronic device can determine its current geographical location regionally by using technologies such as 3rd Generation Partnership Project (3GPP), Global System for Mobile Communication (GSM) or Long Term Evolution (LTE), or other radio access technologies to determine the electronic devices location. An electronic device can determine its current geographical location globally by using technologies such as Global Positioning System (GPS) or Galileo™. While the above describes specific examples of technologies used to configure an electronic device for location-awareness, it will be appreciated that any other suitable technology by which an electronic device can determine the electronic device's location or determine a relative location of the electronic device can be implemented.

A "target location" can include, but is not limited to, a specific location that is discoverable via an electronic device. The target location can have a similar electronic device, which it can communicatively couple with the electronic device initiating the communication. The target location's electronic device can have at least some capabilities similar to the initiating electronic device. Target locations can include businesses, restaurants, cafes, hotels, clothing stores, shoe stores, electronics stores, department stores, boutique shops, comedy clubs, sporting venues, attractions, points of interests, buildings, offices, or any type of location configured to communicate with at least a remote electronic device (for example, over a communication network).

"Media" can include, but is not limited to, visual, audio, or combined visual and audio data which can be outputted by an electronic device. Additionally, "media" refers to transitory or non-transitory media. Examples of media can include, but are not limited to, video files, audio tracks, multimedia files, music files, songs, movies, animations, graphics, MIDI files, or any other media file which can be played or outputted by an electronic device.

The present disclosure provides systems and methods for real-time interaction with a target location, such as a restaurant. In one example embodiment, the present disclosure provides for communication between an electronic device and a target location. The electronic device can be located remotely from the target location. The system and method can include a User Interface (UI) (for example, a mobile application executable on the electronic device, a web-based application, or any other user interface executable on an electronic device), a location module (for example, GPS), a communication link, and one or more audio, video, or both audio and video devices. The electronic device can be configured to respond to requests (for example, user-directed queries) to interact with a target location. In a non-limiting example, the request for interaction can be a request for a video feed. In such an example, after a video feed is selected the video feed can be streamed to the electronic device. The video feed can include a static live-feed from one or more cameras located throughout the target location (for example, a business), video captured by an electronic device, display devices that allow for video-chatting, video conferencing, or teleconferencing with a representative of the target location, or pre-recorded video files. In other embodiments, the real-time interaction with the target location can include receiving live statistics about available seating, availability of items, anticipated wait-time, or other information associated with the target location.

FIG. 1 is a block diagram representing an electronic device interacting with a target location that has video capture devices (not shown). For example, in FIG. 1, the electronic device 101 is interacting with the target location 102 via data connection to a communication network 105. In FIG. 1, the electronic device 101 can connect to a communication network 105 via communication module 107. For example, the communication module 107 can include one or more of a mobile telecommunications module, a cellular communication module, a Wireless Fidelity (Wi-Fi) module, Ethernet or landline module, or any other module, which allows for the communication between the electronic device and target location remote from the electronic device. When the electronic device 101 connects to the communication network, data and location-awareness information can be transmitted over the communications network 105 to the electronic device 101. The communications network 105 can include but is not limited to the Internet, a telephone network, a wireless network, Bluetooth™, a near-field communication network, or a short-range wireless network. Location-awareness information can also be determined by location module 106. For example, the location information can be determined using one or more satellites 104 to determine and acquire the geographical coordinates of the electronic device 101. The plurality of target location 102 can also connect to a communication network 105 via communications module 107 or location module 106 in order to determine the current location of an electronic device associated with the target location. The current location of the electronic device 101 can be stored locally on the electronic device 101, on a server 103, or both locally on the electronic device 101 and the server 103. The server 103 can store specific information in regards to the target locations. For example, information such as the target location's name, address, operating hours, telephone number, current location, and communication options. The server 103 can also receive and respond to requests from the electronic device 101. For example, these requests can include requests for searches for target locations, requests to coupling with a target location, requests for video feeds, requests to video chat or requests for any other information from target locations. While the system illustrated in FIG. 1 includes a server 103, those of ordinary skill in the art will appreciate that electronic device 101 can transmit requests to the electronic device associated with the target location and receive information from the electronic device associated with the target location without communicating with a server. For example, satellite 104 can be a GPS satellite that allows an electronic device 101 to be location-aware so that the electronic device 101 can search (for example, via server 103) for proximal target locations 102a-n within a predetermined distance of the current location of the electronic device 101.

Examples of electronic devices 101 and 102 for real-time audiovisual interaction with a target location will now be described in more detail. An electronic device can be defined as any device that is capable of at least accepting data, transmitting data, and executing commands. Example electronic devices can include, but are not limited to, portable communication devices, mobile communication devices, mobile computers, smartphones, computing pads, tablet computers, personal computers, desktop computers, laptop computers, netbooks, servers, routers, set-top phones, or other electronic devices capable of at least accepting data, transmitting data, and executing commands. Electronic devices 101 and 102 can include a memory (for example high-speed random access memory, non-volatile memory, flash memory, solid-state memory), one or more central processing units (CPU, which for example can run or execute various software programs and/or sets of instructions stored in memory to perform various functions for the electronic devices 101 and 102), a display (for example, a touch sensitive display or touchscreen), a communication module (for example, radio frequency (RF) circuitry or global positioning system), an image module (for example, a still image camera, a moving image camera), audio circuitry (for example, a speaker, a microphone, a headset jack), a power system (for example, a battery, alternating current (AC) adapter), software components (for example an operating system such as Windows, Linux OSX, UNIX). It should be appreciated that devices 101 and 102 are only one example of an electronic device 101 and 102, and that electronic devices 101 and 102 can have more or fewer components than shown, can combine two or components, or can have a different configuration or arrangement of the components. The various components show in FIG. 1 and FIG. 3 can be implemented in hardware, software or a combination of both hardware a software, including one or more signal processing and application specific integrated circuits.

Figure 2:
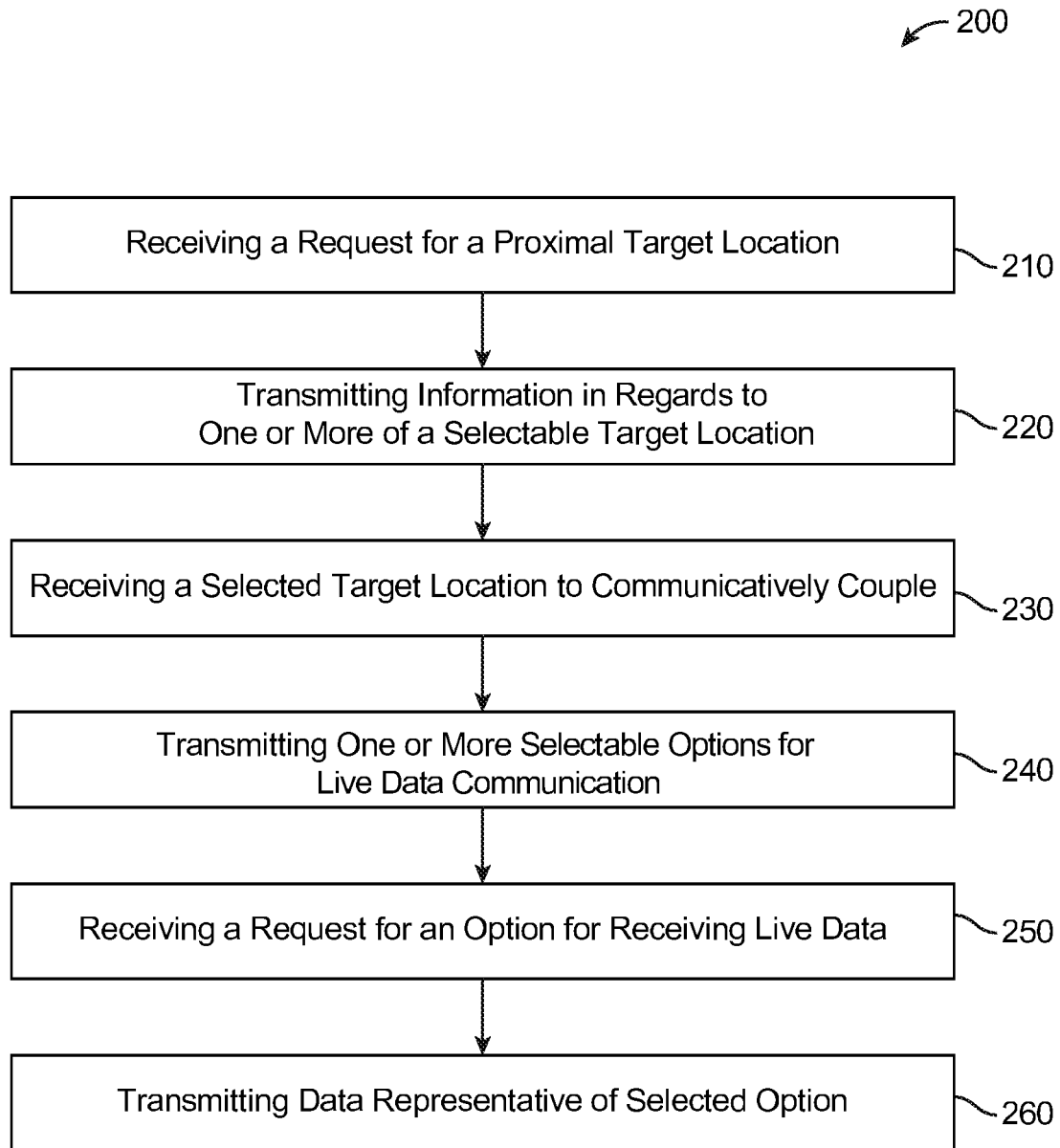
FIG. 2 is a flow diagram of a method of real-time interaction with a target location, in accordance with an example implementation of the present technology.

A server 103 for real time audiovisual interaction with a target location will now be described in more detail. A server can be defined as any device that is capable of running one or more services that serve the needs of other computers or clients on the same communications network. Examples of servers are, web server, communications server, database server, name server, proxy server, print server, and in this specific environment an application server. An application server is a server dedicated to running certain software applications (for example, a real-time audiovisual interaction server). A server can have at least one of a memory (for example high-speed random access memory, non-volatile memory, flash memory, solid-state memory, hard disks), one or more central processing units (CPU, which for example can run or execute various software programs and/or sets of instructions stored in memory to perform various functions for the server 103), a communication module (for example, radio frequency (RF) circuitry or global positioning system), a power system (for example, a battery, alternating current (AC) adapter), software components (for example an operating system such as Windows, Linux, OSX, UNIX and an application such as a real-time audiovisual interaction application). It should be appreciated that server 103 is only one example of a server 103, and that server 103 can have more or fewer components than shown, can combine two or components, or can have a different configuration or arrangement of the components FIG. 2 is a flow chart of an example method of real-time interaction between a user's electronic device and an electronic device associated with a target location. The method 200 illustrated in FIG. 2 is provided by way of example, as there are a variety of ways to carry out the method. Additionally, while the example method is illustrated with a particular order of steps, those of ordinary skill in the art will appreciate that FIG. 2 and the steps illustrated therein can be executed in any order that accomplishes the technical advantages of the present disclosure and can include fewer or more steps than illustrated.

Each block shown in FIG. 2 represents one or more processes, methods or subroutines, carried out in example method. The steps illustrated in FIG. 2 can be implemented in a system including an electronic device 101, a server 103 and an electronic device associated with a target location 102. For example, a smartphone, an electronic tablet, or any other electronic device capable of at least accepting data, transmitting data, and executing commands. Each block shown in FIG. 2 can be carried out by electronic device 101 and electronic device associated with a target location 102 illustrated in FIG. 1. The flow chart illustrated in FIG. 2 will be described in relation to and make reference to the electronic device 101, server 103 and an electronic device associated with a target location 102 in FIG. 1.

Method 200 can begin at block 210. At block 210, a request is received at the server 103 from electronic device 101 to locate one or more of a proximal target location 102. Electronic device 101 can also send its current physical location to server 103. When server 103 receives the request, it can compare the data in the request with data previously stored on server 103 from target locations 102. In one example implementation, the current location of the electronic device 101 can be determined based on data received from a location module 106 coupled to the electronic device 101. For example, the electronic device can comprise a location module 106, such as a Global Position System (GPS). The GPS 106 can determine the geographical coordinates of the current location of the electronic device 101 via satellite 104. In another embodiment, the location module can be a communication module 107 of the electronic device 101. For example, communication module 107 can be a cellular antenna. A cellular antenna 107 can use a triangulation method to determine the location of the electronic device 101. For example, cellular towers proximate the electronic device 101 can be detected by the cellular antenna and can be utilized to determine the current position of the electronic device 101. While a GPS or triangulation method can be implemented to determine the position of the electronic device, other methods of determining the location of an electronic device 101 can be implemented. After the request is sent at block 210, the method can proceed to block 220.

At block 220, server 103 transmits via communication network 105, information associated with one or more of a proximal target locations that are available for communication with electronic device 101. Server 103 compares the data received at block 210, with data previously stored on Server 103. The results of the comparison is information of one or more of a proximal target locations. If there are no results from the comparison, than server 103 transmits to electronic device 101 a statement that no results were found. The information associated with one or more of proximal target locations can be formatted, by an application, for display on the electronic device 101. Such formats can include, but are not limited to: a list, a list with descriptions, a map, a map showing the electronic device's location along with the locations of the target locations, or a street view of targeted locations. After server 103 transmits the information in regards to a one or more of a proximal target locations 102a-n that are available for communication at block 220, the method can proceed to block 230.

At block 230, server 103 can receive a target location selected from electronic device 101. For example, the target location can be selected by receiving an input, at the electronic device 101 (for example, at a touchscreen), where the input is associated with information corresponding to a target location displayed on the touchscreen of the electronic device 101. In response to the received selection, the electronic device 101 can request to communicatively couple with an electronic device located at the selected target location via server 103 or communication network 105. After the electronic device 101 is communicatively coupled with the selected target location at block 230, the method can proceed to block 240.

At block 240, one or more selectable options associated with the selected target location are transmitted from server 103 to be displayed at the electronic device 101. The one or more selectable options can include, but are not limited to, options for retrieving a static live video of the selected target location (for example, an interior of the selected target location), conducting a live chat with a representative of the selected target location, retrieving live data associated with the selected target location, retrieving live statistics associated with the selected target location, retrieving a pre-recorded video associated with the selected target location, any combination thereof, or any other retrieving any other information associated with the target location. After the one or more selectable options are displayed at block 240, the method can proceed to block 250.

At block 250, a selection of one of the one or more options can be received. For example, the server can receive a signal or an input corresponding to a selection of one of the one or more options displayed at the electronic device 101. In at least one implementation, an option corresponding to a pre-recorded video can be received. In response, server 103 can stream the video to the electronic device 101. For example, the streamed video can be a locally-hosted pre-recorded video that includes detailed information associated with the target location. In another implementation, locally—hosted, externally-hosted, or both locally- and externally-hosted video files filmed at the target location can be streamed to the electronic device 101, via server 103. In at least some implementations, the videos can be recorded by other customers of located at the target location. The videos can provide information which can be of interest to the use of the electronic device 101 (for example, in deciding whether to visit the target location 103). Such information can include what type of food is served at the target location, how capable the location is of hosting an event, an availability for dining reservations, a type of décor, or any other information associated with the target location 102. After the server 103 receives a selected request for data communication at block 250, the method can proceed to block 260.

At block 260, server 103 transmits to electronic device 101, via a data communication network, data representative of the selected video or data stream. In at least one implementation, server 103 transmits a video chat from a representative of target location 102 to electronic device 101. In another implementation, server 103 can receive a video chat response from electronic device 101. In another implementation, the video stream transmitted can be from a stationary video camera. In one implementation, server 103 receives commands to control the stationary a video camera at the target location by electronic device 101. In another implementation, server 103 can transmit selectable icons which are displayed in combination with the video feed at electronic device 101 (for example, the icons can be overlaid on the live video, displayed proximate to or adjacent to the live video, or displayed with the live video).

Figure 3A:
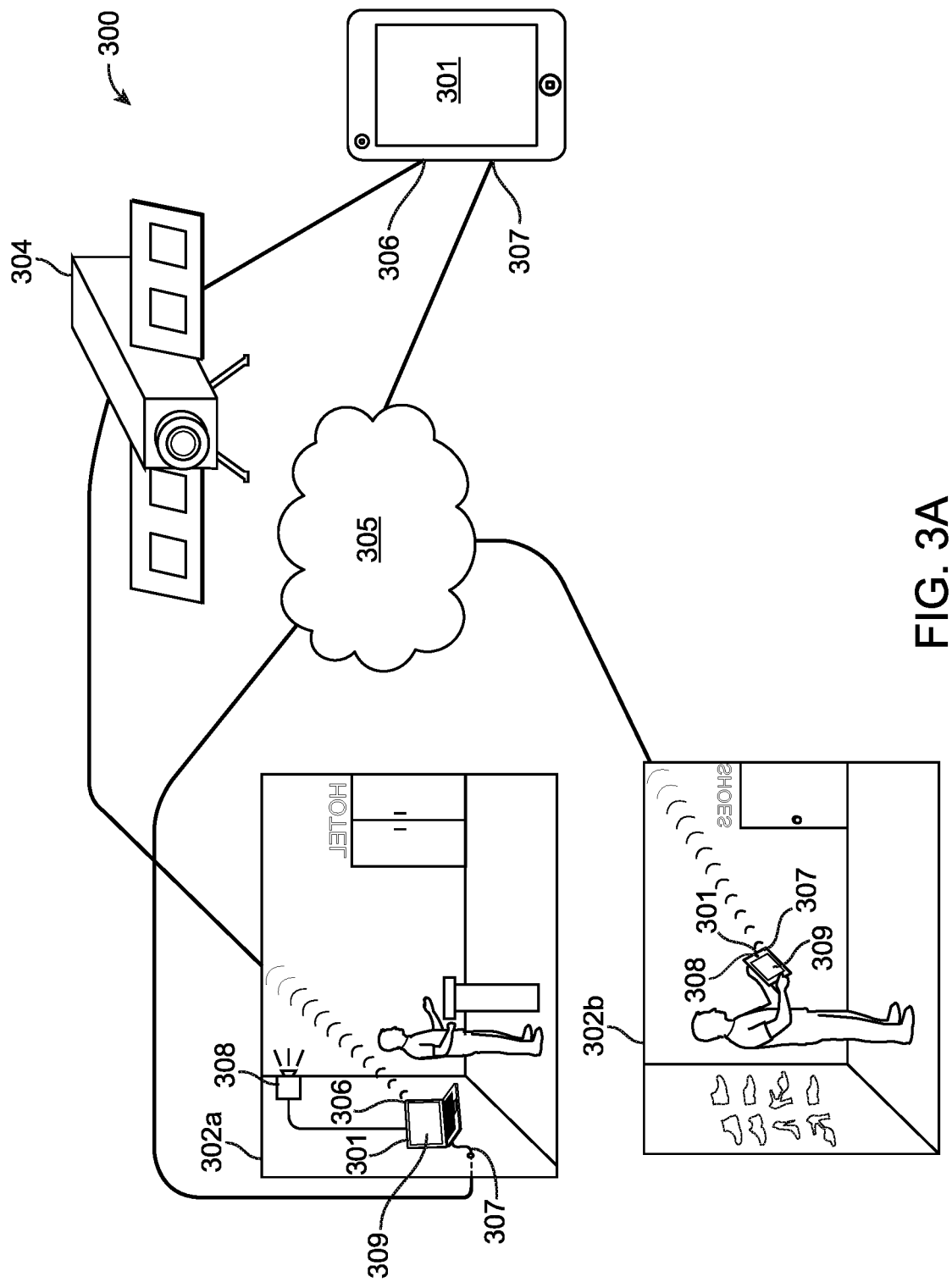
FIG. 3a is an illustration of an electronic device engaging in real-time interaction with a target location, in accordance with an example implementation of the present technology.

FIG. 3a is an illustration representing an example electronic device interacting with a target location that has an image module capable of capturing real-time video. Electronic device 301 can request, through a communication network 305, to receive a data stream from the electronic device associated with the target location 302. A GPS satellite 304 and a communication network 305 can be utilized to provide location information to the electronic devices 301 and the electronic devices associated with target locations 302. Receiving location information from one or more GPS satellites or communication networks can be beneficial where the target locations are moving target locations, such as a food truck, pop-up store or a traveling location.

Figure 3B:
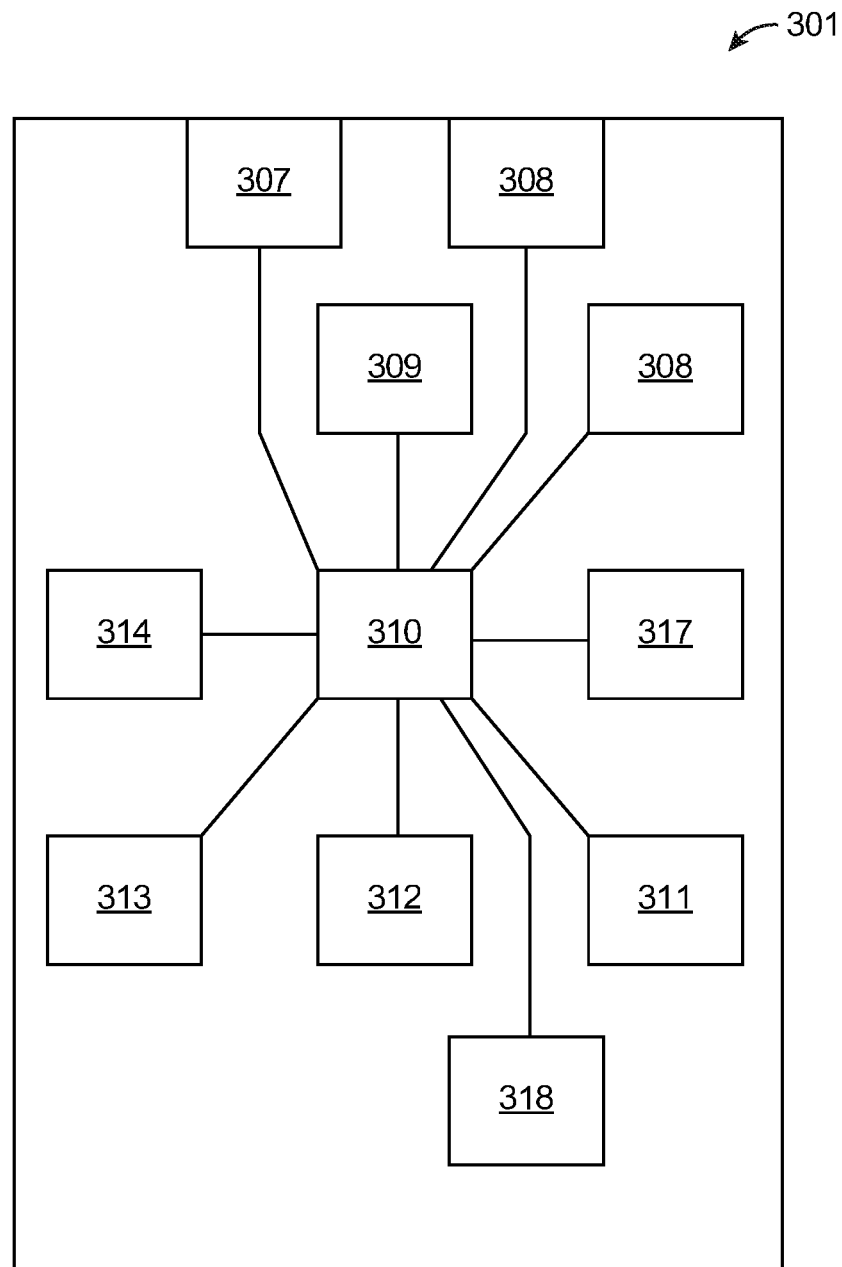
FIG. 3b is a block diagram of an example electronic device, in accordance with an example implementation of the present technology.

FIG. 3a also illustrates an example electronic device 301 (of which a block diagram is illustrated in FIG. 3b). Electronic device 301 can include, but is not limited to, a front image module 308, a rear image module 317, a touch sensitive display 309, a communication module 306, and a location module 306. The front image module 308 (for example, a camera module) can capture still or moving images from the front of the electronic device 301. The rear image module 317 can capture still or moving images from the rear of the electronic device 301. The touch sensitive display or touchscreen 309 can be utilized as an input device. For example, the touchscreen 309 can detect contact and any movement or breaking thereof, indicating the entry of an input. For example, the touchscreen 309 can detect inputs via capacitive, resistive, infrared, surface acoustic wave technologies, or any other technology by which inputs can be detected an input at an electronic device 301. The location module 306 can be configured to determine or detect the location of the electronic device 301. For example, the location module 306 can be a GPS module. The location information determined by the location module 306 can be utilized by various applications executed by the electronic device 301. For example, such applications can include location based mapping and navigation, checking-in applications such as Facebook™ and Foursquare™, imageand location-based applications such as Dabble™ or Instagram™, or any other application which utilizes the location of the electronic device 301. Additionally, the location information can be utilized for an application configured to execute any of the methods of real-time interaction with a target location described herein. The electronic device 301 illustrated in FIGS. 3a and 3b can also include one or more central processing units (CPU) 310, a memory 311 (which can include one or more computer readable storage mediums), a microphone 312 for audio input, an earphone speaker for outputting audio, a speaker for outputting audio, an earphone jack 318 for coupling a headphone or headset to which audio is output, or any other component for processing, transmitting, or receiving information.

FIG. 3a illustrates example target locations 302a and 302b. For example, in FIG. 3a, the target locations can include a hotel 302a and a shoe store 302b. Each of these target locations (302a and 302b) can include image module devices from which real-time interaction data can be transmitted to and received from electronic devices 301 remote from the target location. For example, such an image module devices can include a still image camera; a moving image camera; a wearable moving image camera; a self flying or hovering moving image camera; a smartphone, a tablet computer, personal digital assistant, a laptop computer or any other electronic device with a moving image camera and microphone; or any of the aforementioned descriptions of the various technologies encompassed by electronic device 301. Target locations (302a and 302b), can include static moving image cameras positioned or located within or at the respective target location (302a and 302b); controllable moving image cameras locally controllable at the respective target location (302a and 302b) (for example, a helmet camera attached to a representative); remotely controllable moving image camera controllable by an electronic device remote from the respective target location (302a and 302b) (for example, a moving image camera that can pan a target location or a moving image camera mounted on a trolley or vehicle that can be navigated around the target location); Both locally and remotely controllable moving image camera; electronic devices by which representatives of the respective target location (302a and 302b) can video chat face-to-face with remotely located electronic devices; electronic devices which are configured to allow remotely-located electronic devices to view products located at the respective target location (302a and 302b); electronic devices configured to interact with one or more remotely-located electronic devices to provide a guide or tour of the respective target location (302a and 302b) (for example, to provide a tour or guide of: prospective hotel rooms, prospective tables, restaurant décor, or individual products); locally or remotely-located computer-storage mediums storing pre-recorded video to be transmitted to a user's electronic device (for example, via the internet); one or more remote-controlled video capture devices, which can be remotely or locally controlled, by the target location of the electronic device of a user requesting interaction with the target location, to move about the target location (302a and 302b)

Figure 4A:
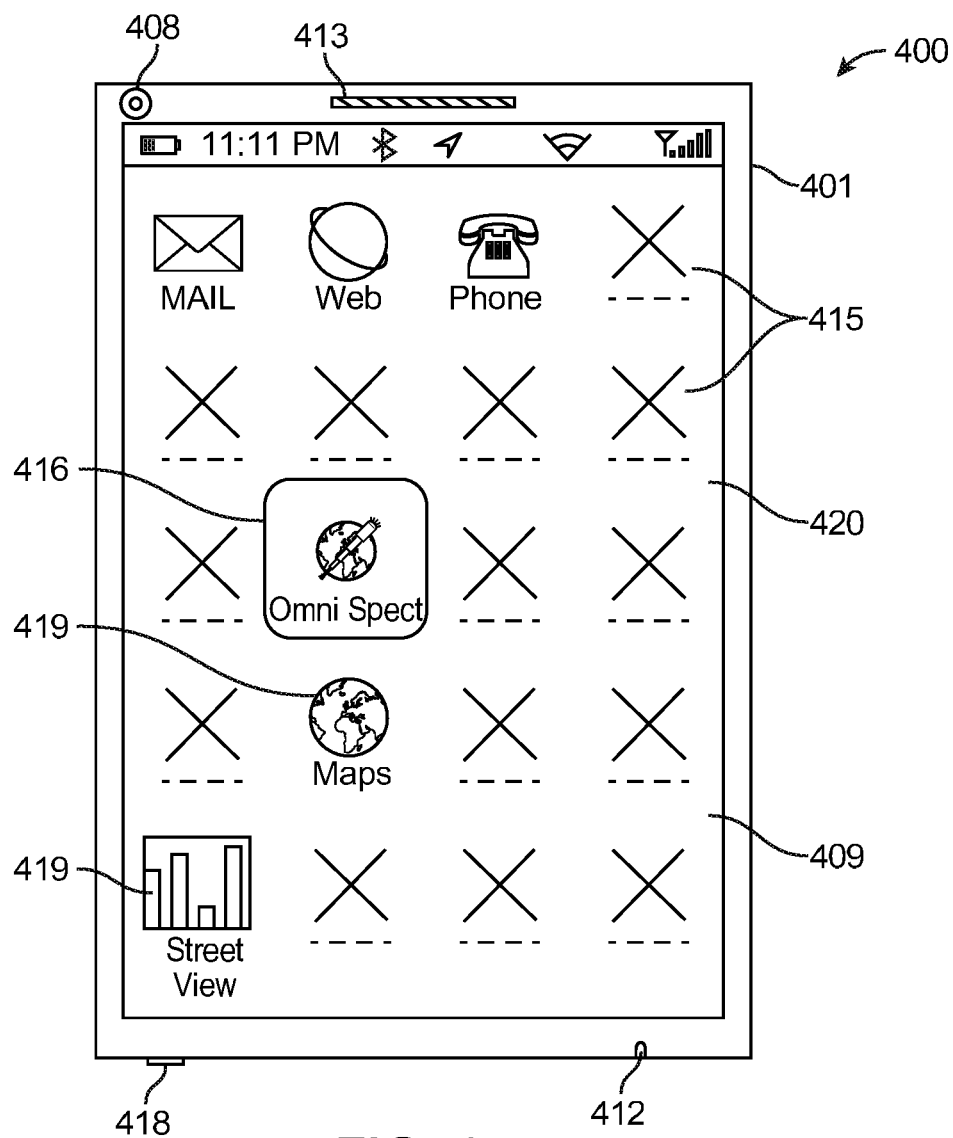
FIG. 4a is an example front view of an electronic device illustrating an example user interface (UI) of a system configured for real-time interaction with a target location, in accordance with an example implementation of the present technology.
Figure 4B:
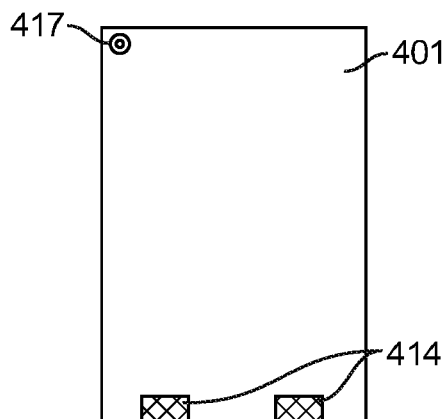
FIG. 4b is an example of a rear view of an electronic device configured for real-time interaction with a target location, in accordance with an example implementation of the present technology.

FIG. 4a illustrates the front view of an example electronic device 401. Electronic device 401 can include a touchscreen 409, a user interface 420 and one or more selectable applications 415 with an icon 416 highlighted for selection. For example, the one or more selectable applications can be presented in a list. Each of the one or more selectable applications can be represented by an icon. The icons can be selected via user inputs received at the electronic device. For example, such user inputs can include double or single clicking, gaze tracking, motion inputs, audible inputs, voice command, tap inputs at the touch screen, stylus inputs, key pressings, or any other input which can be received by the electronic device to indicate that a selection has been made. When an application is selected, the icon corresponding to the selected application can be highlighted, thereby designating or distinguishing the selected application from the remaining applications presented in the list of applications. The example electronic device 401 can include an earpiece speaker 413, a front image module 408, a microphone 412, and earphone jack 418. The earpiece speaker 413 can produce audio for private listening. The front image module 408 can be configured to capture video of the end-user for video chat purposes. The microphone 412 can be configured to capture audio such that the captured audio can be transmitted to the target location during real-time interaction between the target location and the electronic device. The earphone jack 418 can be configured to couple headphones, a headset, a Bluetooth™ headset, or other audio output devices. User Interface 420 displays one or more user-selectable applications 415, including a highlighted application 416 that represents an application configured to execute the presently disclosed method of real-time interaction with a target location. In another implementation, the real-time interaction with a target location can be incorporated with existing applications executable on the electronic device. For example, real-time interaction with a target location can be incorporated with an existing maps application, a street view map application, an augmented reality application, a social networking application, a website of a target location, or any other application by which an electronic device can search for and receive information associated with target locations FIG. 4b illustrates the rear view of an example electronic device 401. Electronic device 401 can include a rear image module 417. The rear image module 417 can be configured to capture video for use in the street view application in which an example can be seen in FIG. 7. Electronic device 401 can also include rear speakers 414 for producing audio.

Figure 5:
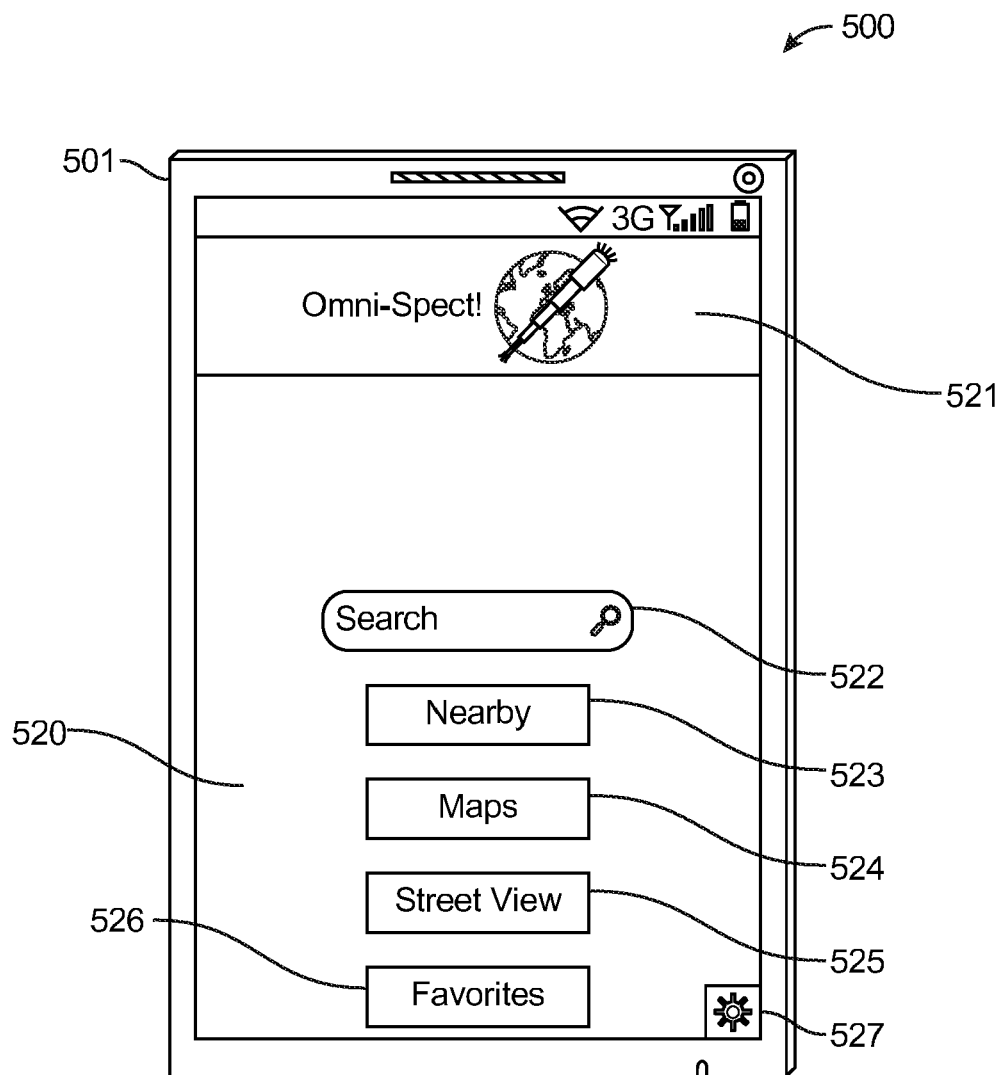
FIG. 5 is an example screenshot of a UI for determining a target location for real-time interaction displayed on an electronic device, in accordance with an example implementation of the present technology, illustrating the main menu with selectable options.

After a user executes the highlighted application 416 shown in FIG. 4a, the application 416 is displayed on the touchscreen 409 of the electronic device 401. An example screenshot of this can be seen in FIG. 5. In FIG. 5, when highlighted application 416 is initiated, a User Interface 520 including a title bar with logo 521 associated with the highlighted application can be displayed on the touchscreen 509. Also illustrated in FIG. 5, UI 520 can include one or more selectable options 522, 523, 524, 525, 526, and 527. The selectable options can include a search bar 522, a nearby option 523, a maps option 524, a street view option 525, a favorites option 526 and a settings option 527. The search bar 522 can accept search terms from the user of electronic device 501 for searching for specific target locations. The nearby option 523 can be selected to search for target locations proximate or within a predetermined distance from the current location of the electronic device. In one example, nearby option 523 can have a default predetermined distance setting. In another example, the predetermined distance can be a user-defined setting in the settings option 527. The maps option 524 allows a user to view nearby target locations graphically on a local area map. The Street View option 525 would allow for the user to explore an actual view of the street, determined by their location, on the screen of the electronic device, utilizing the rear image module (not shown) of the electronic device 501. Shortcut 526 links to the individual user's favorites. Application settings 527 allow for specified application settings to be changed, for example the distance of the default proximity.

Figure 6:
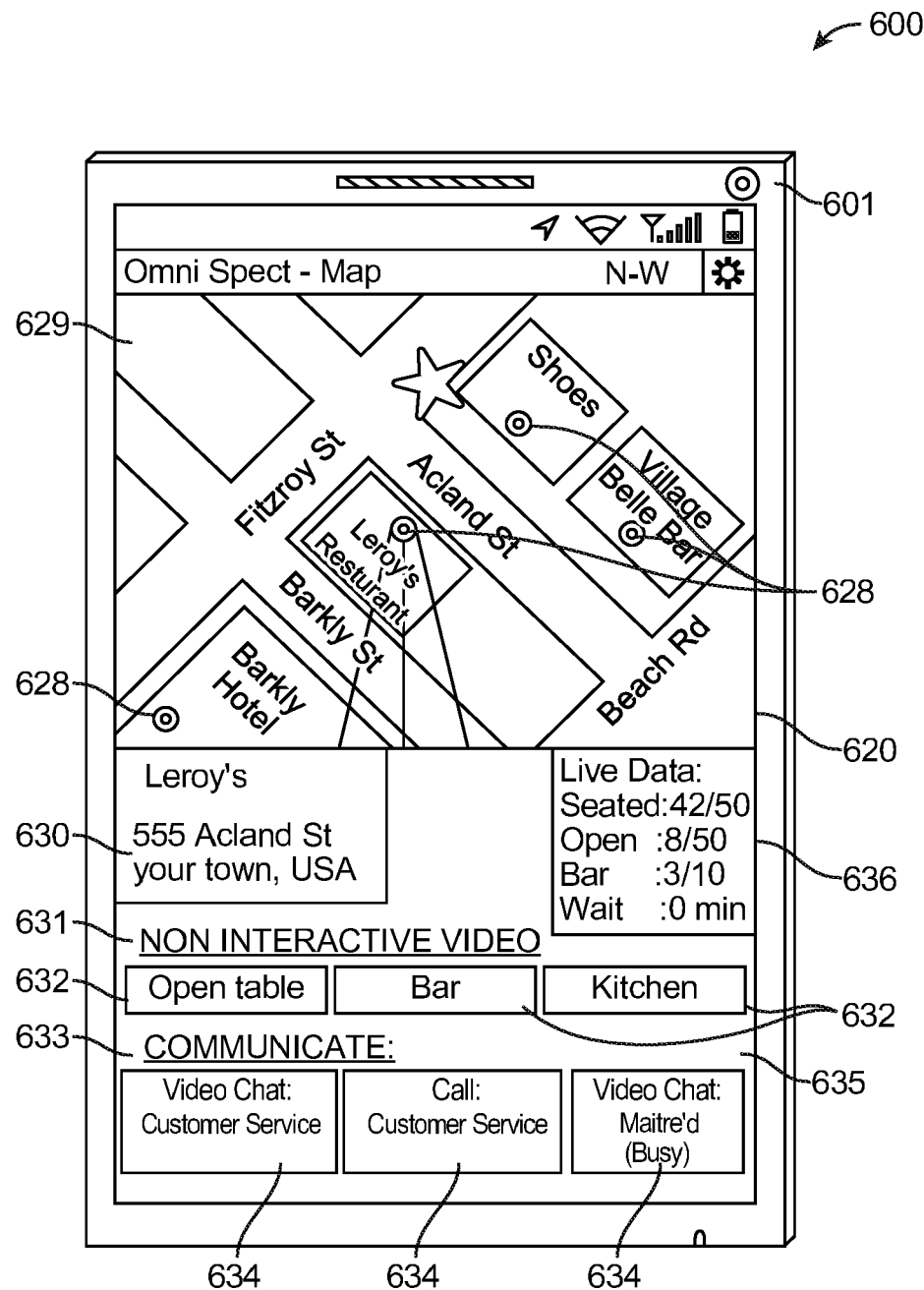
FIG. 6 is an example screenshot of a UI for determining a target location for real-time interaction that is displayed on an electronic device, in accordance with an example implementation of the present technology, illustrating the selection of a target location from a map-view.

In FIG. 6, the Maps option 524 (shown in FIG. 5) has been selected, and in response a map 629 is displayed on the display of the electronic device 601. The map 629 can display the user's current location and the area surrounding the user's location, a selected target location, or the selected target location and the user's current location with respect to the selected target location. In FIG. 6, the map 629 illustrates the current location of the user's electronic device with respect to a selected target location (Leroy's Restaurant). The current location of the electronic device (which can be representative of the current location of the user) can be represented on the map by a star icon, as illustrated, but those of ordinary skill in the art will appreciate that the current location can be identified by a circle, an arrow indicating a direction the user is facing, a customizable icon that is selected by the user, a flag, or any other graphical item or text which can identify the current location of the user's electronic device. In at least one example, the map 629 can display the current location of the user's electronic device and targeted locations 628 within a predetermined distance from the current location of the user's electronic device. As discussed above, the target location 628 Leroy's Restaurant has been selected. In response to selecting the icon 628 representing Leroy's Restaurant, information associated with Leroy's Restaurant can be displayed on the map. For example, the information can be display in a pop-up window, in a text box overlaid on the map, in a frame adjacent to the map, or elsewhere on the UI 620. The information can include details describing the building, establishment, business, attraction, or venue associated with the selected target location. For example, in FIG. 6, the information can include one or more of: information about the target location 630 (for example, name, address, business hours, phone number), a non-interactive video feed 631, available non-interactive video feed options 632, live data 636 (for example seating availability, waiting time) or any other information associated with the target location. In one example, the non-interactive video feeds 632 can include an open table view, a bar view, and a kitchen view. The open table can show available tables for booking a reservation. The bar view can be a real-time video feed of the bar so the user can see the atmosphere. The request view can display a specific view from Leroy's Restaurant specified by the user. In other words, the request view can provide a customer-specific or a customized view of the target location. Other video feeds can include views of bar, a dining room, a kitchen, available products, hotel lobbies, or restaurant seating The UI 620 can also include an interactive options menu 633. The interactive options menu 633 can include options for interactive video communication 634 (for example, video chatting with an individual, such as customer service representatives, maître d', employees, managers, or controlling a mobile camera). By selecting a specific individual 634 to communicate with the user is then audio and visually connected to that specific individual, (for example, if the user selected Maitre'd 634, they could ask about the dress code of the target location or to get their name on a waiting list). The information associated with the target location can also include live statistical information 636. For example, live statistical information can include average wait time and seating availability. The live statistical information can be updated in real-time. In FIG. 6, the live statistical information 636 can indicate that Leroy's is currently has eight available seats for lunch and seven open seats at the bar. Based on such information, the user can request, via the user's electronic device, a reservation of a seat for lunch. The availability of seats can be determined by linking or synchronizing a computer system associated with the target location and the internet or a server that communicatively couples the user's electronic device and the target location).

Figure 7:
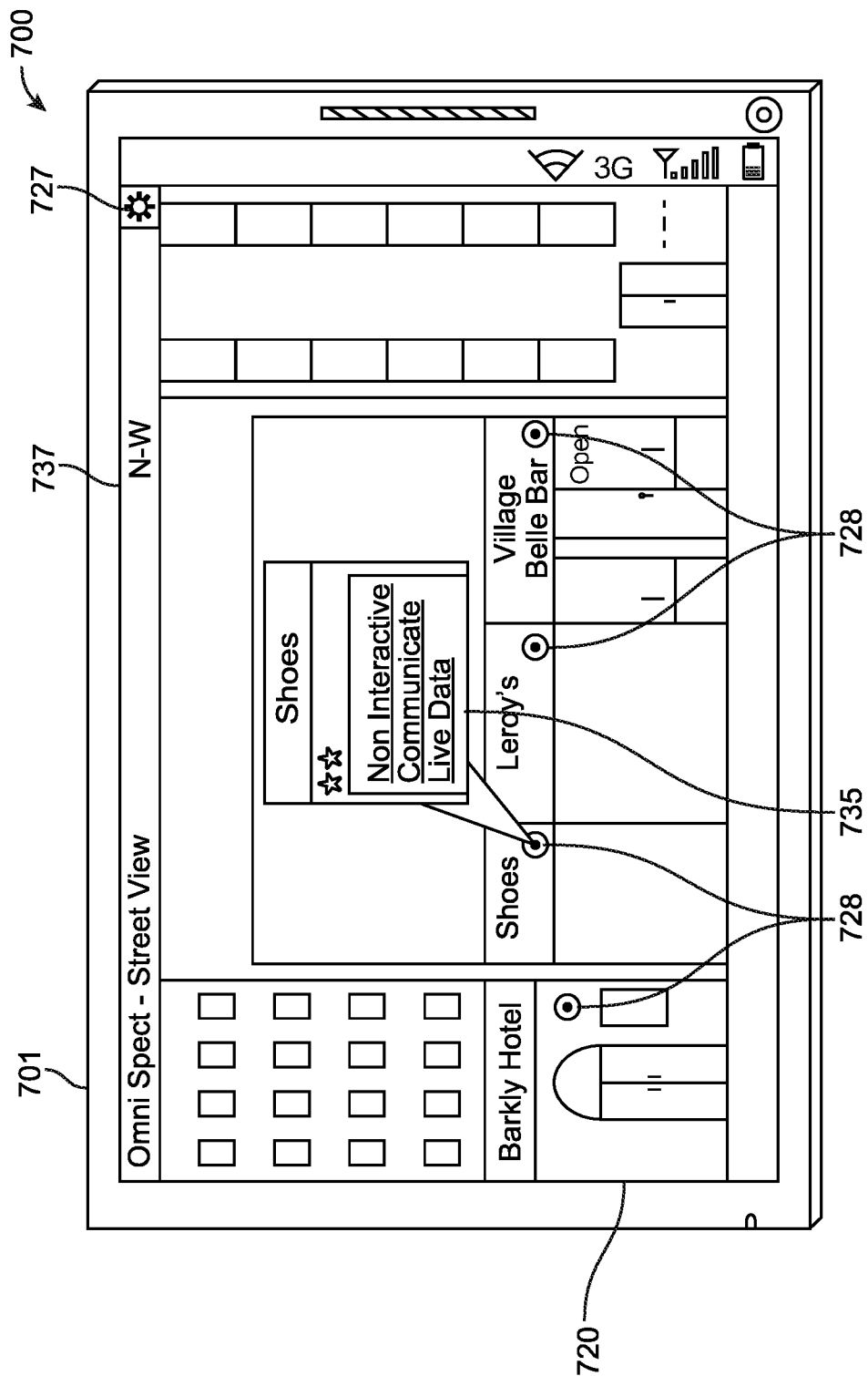
FIG. 7 is an example screenshot of a UI for determining a target location for real-time interaction displayed on an electronic device, in accordance with an example implementation of the present technology, illustrating a street-view of the selected target location selected in FIG. 6.

FIG. 7 illustrates a User Interface 720 that can be displayed on an electronic device 701 in response to a selection of the Street View option 525 illustrated in FIG. 5. When the Street View option is selected, a first-person view (for example, a virtual reality view or a view taken from the perspective of the user as if the user is physically standing in the street) of the user's current location can be displayed. Street view can operate by using a preexisting photograph of the street if it is available. If a preexisting photograph of the street at the current location is not available the user can use the rear image module and touch screen to implement an "augmented reality" Street View. In addition to the street view of the user's current location, available target locations can be included. The available target locations can be identified by selectable markers 728 (for example, Barkly Hotel, Shoes, Leroy's and Village Bell Bar are all shown to have selectable markers 728). If a marker is selected, an information box 735 can be displayed with, adjacent to, on top of, overlaid or in place of the street view (for example, the Shoes marker 728 is selected and information box 735 is displayed as a pop-up box adjacent to Shoes marker 728 via UI 720). The information box 735 can include detailed information associated with the target location corresponding to the marker 728 selected. For example, the information box 735 can include information for initiating non-interactive videos, communication via video chat, live statistics, target location name, target location address, target location phone number, and target location rating. The target location ratings can be integrated in application 416 (shown in FIG. 4) or can be third-party ratings software (for example, tripadvisor.com or booking.com). The target location ratings can enable a user to view or leave a review or feedback (for example, written or video review) of their experience with a target location, view or leaving ratings (for example, a star rating) of a target location, or discuss a target location via an online forum. The target location ratings can enable a user to make a more educated decision when selecting a target location for an audiovisual interaction. The UI 720 also includes a compass 737 (for example, compass 737 can tell a user which direction they are currently facing and which direction they need to walk in order to get arrive at the target location).

Figure 8:
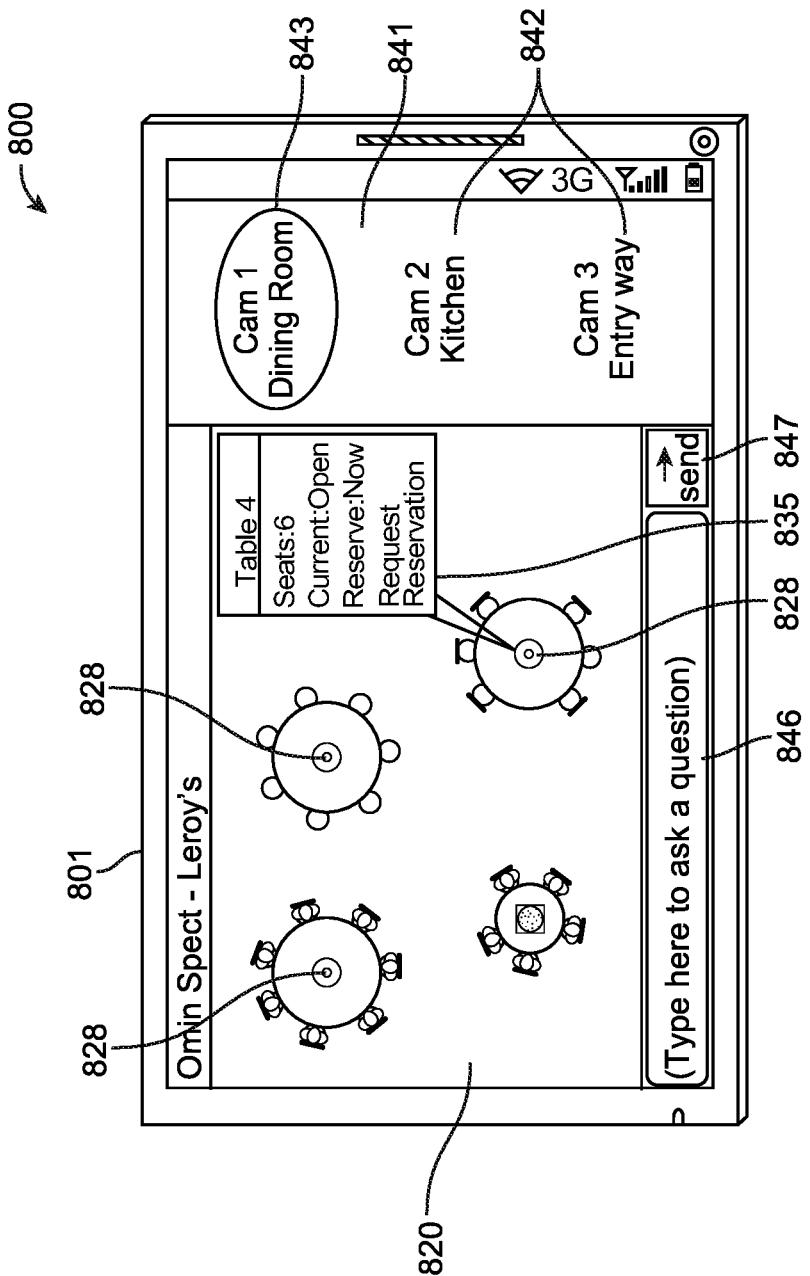
FIG. 8 is an example screenshot of a UI for determining a target location for real-time interaction displayed on an electronic device, in accordance with an example implementation of the present technology, illustrating a real-time interaction with the selected target location selected in FIGS. 6 and 7, where the real-time interaction is a video feed from the selected target location.

FIG. 8 illustrates a UI 820 that can be displayed on an electronic device 801 when the open table view 632 is selected from the UI illustrated in FIG. 6. FIG. 8 can show a live feed of a top down view of the dining room from a static camera located in Leroy's. In another example this camera could be located in any location in any type of target location: conference, stadium, top of skyscraper, or the inside of a store. The user is currently viewing the highlighted dining room video feed 843. A user can select different video feeds 842 by using video selection box 841 (for example, a kitchen video feed and entry way video feed). The open table view can have virtual icons 828 which can be overlaid actual tables viewed from the dining room video feed 843 (for example, tables currently available or available at a later time can have a selectable icon 828). If an icon is selected, an information box 835 can be displayed with, adjacent to, on top of, overlaid or in place of the open table view (for example, the Table 4 icon 828 is selected and information box 835 is displayed as a pop-up box adjacent to the Table 4 icon 828 via UI 820). The information box 835 can include the type and seating capacity of the table, along with live data correlating to reservations, such as the option of reserving a table for now, or reserving a table for a later point of time. The user can also ask questions of either a live representative at the establishment or another answering entity (for example an automated response system), by using text box 846 and send button 847.

Figure 9:
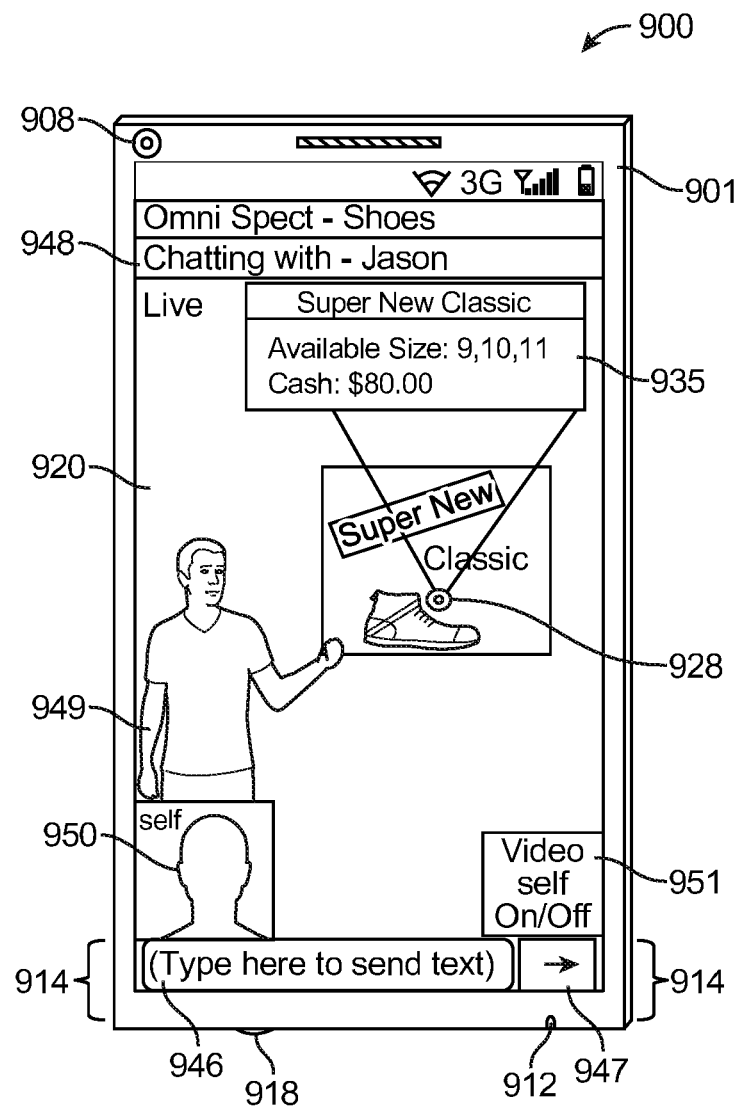
FIG. 9 is an example screenshot of a UI for determining a target location for real-time interaction displayed on an electronic device, in accordance with an example implementation of the present technology, illustrating real-time interaction with the selected target location selected in FIGS. 6 and 7, where the real-time interaction is a real-time chat.

FIG. 9 illustrates a UI 920 that can display, on an electronic device 901, a video chat when selected from information box 735 in Street View illustrated in FIG. 7. When the communicate option is selected, a live chat with a customer representative at a target location can be displayed. FIG. 9 can show a video chat with a representative using an electronic device (not shown) associated with the target location (for example, the representative could be using a handheld device, tablet computer, smartphone, a stationary camera attached to a computer, or any device with audio, video and transmitting, receiving capabilities). The user communicated with the representative of the target location using microphone 912, speakers 914 and front image module 908. The user can also have a private video chat by connecting earphones to electronic device 901 via earphone jack 918. The user, while video chatting, can get more information on available products and services offered at the target location (for example, the representative can show the user available product and demonstrate how they work, they can give the user a tour of a hotel room, or they can speak with them about reservations). UI 920, can display one or more of the following: a Title bar 948, which can details of the representative in the video chat (for example, name of the representative or target location the user is video chatting), the representative 949 with whom the user is video chatting, video of the user 950 via front image module 908, a toggle control 951 for turning on and off the video of the user 950, and for increased clarity, text messages can be sent to the representative using text box 946 and send key 947. Toggle control 951 can help ensure privacy of the user of electronic device 901 by turning the video capabilities of electronic device 901 off and on. The toggle control 951 can also be enabled to blur the user's face or cover it with a color or image. The option to toggle on or off a video stream, blur faces, or cover faces with a color or image can also be enable by a representative of a target location. The representative of a target location can protect the privacy of the patrons of a target location by blurring or covering the patron's faces in the video stream. This can ensure all patrons' privacy rights are protected. While video chatting with a representative of a target location, the representative can display to the user a product for sale (for example a shoe). A virtual icon 928 can be overlaid the actual product being displayed by the representative. If an icon 928 is selected an information box 935 can be displayed with, adjacent to, on top of, overlaid, or in place of the product being displayed (for example, the Super New Classic icon 928 is selected and information box 935 is displayed as a pop-up box on top of Super New Classic icon 928 via UI 920). The information box 935 can include the available sizes, the cost or any information that would be relevant to the product being displayed.

Figure 10:
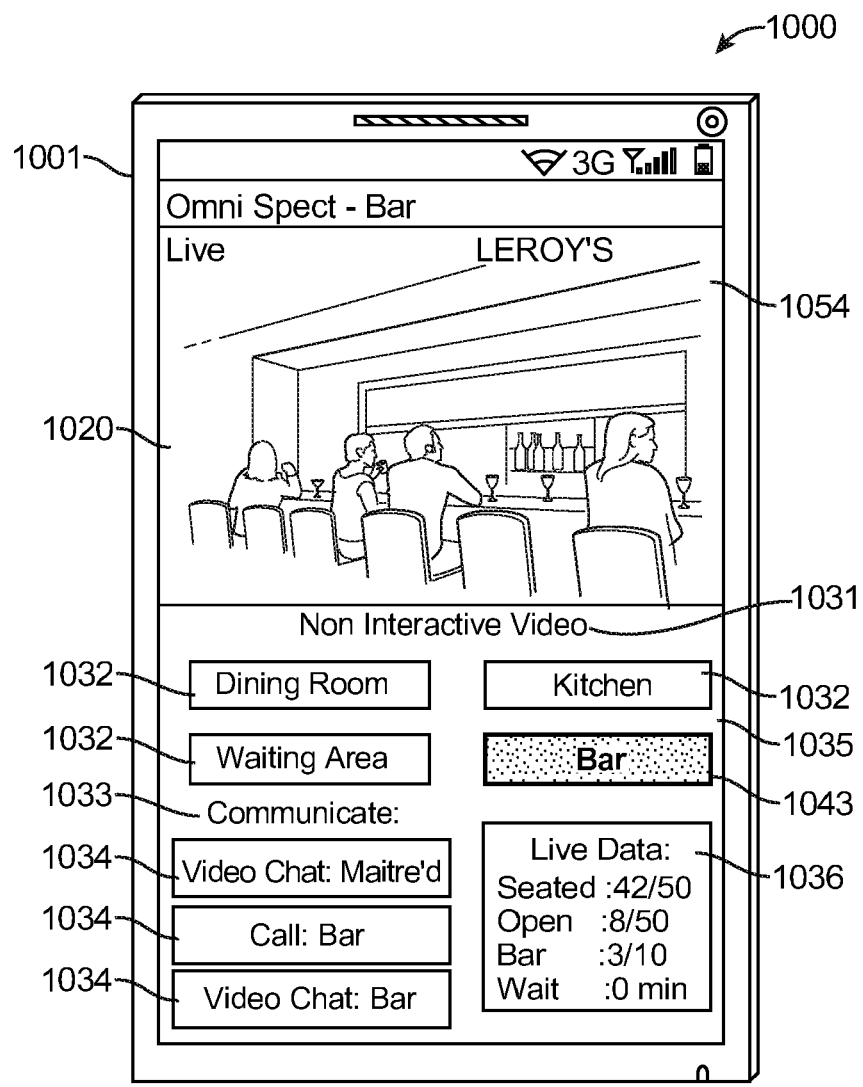
FIG. 10 is a screenshot of a UI for determining a target location for real-time interaction displayed on an electronic device, in accordance with an example implementation of the present technology, illustrating a plurality of options for real-time interaction with a selected target location.

FIG. 10 illustrates a UI 1020 configured for display on an electronic device 1001 when the bar feed 632 from non-interactive video 631 is selected from the UI illustrated in FIG. 6. FIG. 10 shows a live video feed of the bar from a static camera located in Leroy's. In another example the camera could be located in any location in any type of target location: conference, stadium, top of skyscraper, or inside a store. The user is currently viewing the bar video feed 1043 (which is highlighted), but can also switch to different video feeds in the venue by using touchscreen 1054 (for example, the user can select different video feeds from the non-interactive video menu 1031, such as, dining room 1032, waiting area 1032, or kitchen 1032). UI 1020 can also include a communications menu 1033. The communication menu 1033 can include options or video and non-video communication (for example, video chat or telephone call). By selecting a specific individual 1034 to communicate with the user is then audio and visually connected to that specific individual, (for example, if the user selected Maitre'd 1034, they could ask about the dress code of the target location or to get their name on a waiting list). The information associated with the target location can also include live statistical information 1036. For example, live statistical information can include average wait time and seating availability. The live statistical information can be updated in real-time. In FIG. 10, the live statistical information 1036 can indicate that Leroy's is currently has eight available seats for lunch and seven open seats at the bar. Based on such information, the user can request, via the user's electronic device, a reservation of a seat for lunch. The availability of seats can be determined by linking or synchronizing a computer system associated with the target location and the internet or a server that communicatively couples the user's electronic device and the target location)

The aforementioned disclosure offers the user information via real-time experiences at the locations of their choice. Experiencing a location remotely provides the user with something more than just a recommendation or someone else's opinion of, it provides the comfort of knowing you'll get the experience you desire when choosing to go to that specific restaurant, bar, clothing store, shoe store, consumer market place, or any other location.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, or TCL, as well as combinations thereof. The server(s) can also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network ("SAN") familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system can also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device.

Embodiments of the present disclosure can be provided as a computer program product including a non-transitory machine-readable storage medium having stored thereon instructions (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments can also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software can be via Internet download.

Based on the disclosure and teachings provided herein, it will be understood that other ways and methods of implementing the various embodiments described above are possible. The specification and drawings are illustrative and are not to be construed as limiting the scope of the following claims.

The invention claimed is:

1. A computer-implemented method for providing an interaction between an electronic device and a target location comprising:
receiving an identification of a target location with interactive video availability;
transmitting a request to the target location, for an interactive video feed associated with the target location;
receiving the interactive video feed associated with the target location;
transmitting the video feed a user interface, wherein the user interface displays an interactive video option corresponding to the interactive video feed;
receiving a user interaction input, the user interaction input based at least in part on the interactive video option and configured to adjust at least one display parameter of the interactive video option; and
receiving a transaction request generated based on the interactive video option.

2. The method of claim 1, wherein the interactive video feed includes a live video chat.

3. The method of claim 1, wherein the interactive video feed includes a live video feed of an interior of the target location.

4. The method of claim 3, wherein the interactive video feed is produced by a controllable camera controllable by the user interaction input based on the interactive video option corresponding to the live video feed.

5. The method of claim 3, wherein the live video feed is produced by an electronic device at a physical premises of the target location.

6. The method of claim 5, wherein the electronic device comprises one or more of: a still image camera, a moving image camera, a wearable moving image camera, a self flying or hovering moving image camera, a smartphone, a tablet computer, a laptop computer, and a remotely controlled moving image camera.

7. The method of claim 1, wherein the user interface displays one or more video clips captured at a physical premises of the target location by one or more users at the target location.

8. A system for providing an interaction between an electronic device and a target location, the system comprising:
   at least one processor; and
   a memory storing instructions, which when executed by the at least one processor, causes the at least one processor to:
      receive an identification of a target location with interactive video availability;
      transmit a request to the target location, for an interactive video feed associated with the target location;
      receive the interactive video feed associated with the target location;
      transmit the video feed a user interface, wherein the user interface displays an interactive video option corresponding to the interactive video feed;
      receive a user interaction input, the user interaction input based at least in part on the interactive video option and configured to adjust at least one display parameter of the interactive video option; and
      receive a transaction request generated based on the interactive video option.

9. The system of claim 8, wherein the interactive video feed includes a live video chat.

10. The system of claim 8, wherein the interactive video feed includes a live video feed of an interior of the target location.

11. The system of claim 10, wherein the interactive video feed is produced by a controllable camera controllable by the user interaction input based on the interactive video option corresponding to the live video feed.

12. The system of claim 10, wherein the live video feed is produced by an electronic device at a physical premises of the target location.

13. The system of claim 12, wherein the electronic device comprises one or more of: a still image camera, a moving image camera, a wearable moving image camera, a self flying or hovering moving image camera, a smartphone, a tablet computer, a laptop computer, and a remotely controlled moving image camera.

14. The system of claim 8, wherein the user interface displays one or more video clips captured at a physical premises of the target location by one or more users at the target location.

15. At least one non-transitory computer-readable medium storing instructions, which when executed by at least one processor, causes the at least one processor to:
   receive an identification of a target location with interactive video availability;
   transmit a request to the target location, for an interactive video feed associated with the target location;
   receive the interactive video feed associated with the target location;
   transmit the video feed a user interface, wherein the user interface displays an interactive video option corresponding to the interactive video feed;
   receive a user interaction input, the user interaction input based at least in part on the interactive video option and configured to adjust at least one display parameter of the interactive video option; and
   receive a transaction request generated based on the interactive video option.

16. The at least one non-transitory computer-readable medium of claim 15, wherein the interactive video feed includes a live video chat.

17. The at least one non-transitory computer-readable medium of claim 15, wherein the interactive video feed includes a live video feed of an interior of the target location.

18. The at least one non-transitory computer-readable medium of claim 17, wherein the interactive video feed is produced by a controllable camera controllable by the user interaction input based on the interactive video option corresponding to the live video feed.

19. The at least one non-transitory computer-readable medium of claim 17, wherein the live video feed is produced by an electronic device at a physical premises of the target location.

20. The at least one non-transitory computer-readable medium of claim 19, wherein the electronic device comprises one or more of: a still image camera, a moving image camera, a wearable moving image camera, a self flying or hovering moving image camera, a smartphone, a tablet computer, a laptop computer, and a remotely controlled moving image camera.

* * * * *